United States Patent [19]

Kluth et al.

[11] Patent Number: 4,489,176

[45] Date of Patent: Dec. 18, 1984

[54] POLYURETHANE COMPOSITIONS USEFUL AS ADHESIVES FOR INSULATION MATERIALS AND/OR FACINGS

[75] Inventors: Hermann Kluth; Robert Bachmann, both of Duesseldorf; Georg Böerner, Bad Hersfeld, all of Fed. Rep. of Germany

[73] Assignee: Henkel Kommanditgesellschaft auf Aktien, Duesseldorf, Fed. Rep. of Germany

[21] Appl. No.: 608,326

[22] Filed: May 8, 1984

[30] Foreign Application Priority Data

May 11, 1983 [DE] Fed. Rep. of Germany ....... 3317193

[51] Int. Cl.$^3$ .............................................. C08G 18/14
[52] U.S. Cl. ................................ 521/144; 156/331.4; 252/182; 427/385.5; 427/387; 521/112; 521/131; 524/265; 524/590; 528/67; 528/76; 528/77

[58] Field of Search ...................... 524/144, 590, 265; 528/76, 77, 67; 252/182; 156/331.4; 427/387, 385.5; 521/112, 131

[56] References Cited

U.S. PATENT DOCUMENTS 3,830,760 8/1974 Bengtson ............................. 521/112

OTHER PUBLICATIONS

Saunders & Frisch, "Polyurethanes, Chemistry and Technology", vol. XVI, High Polymer Series, Interscience Publishers, Part I (1962), Part II (1964).
I. R. Schmolka, "Nonionic Surfactants", ed. by M. J. Schick, vol. 2, Marcel Dekker, New York, (1967).

*Primary Examiner*—Maurice J. Welsh
*Attorney, Agent, or Firm*—Ernest G. Szoke; Mark A. Greenfield; Henry E. Millson, Jr.

[57] ABSTRACT

A polyurethane composition containing a polyurethane prepolymer, a foam stabilizer, a diluent, and optional auxiliary agents, useful as an adhesive for building insulation and/or decorative facing on a variety of substrates.

24 Claims, No Drawings

POLYURETHANE COMPOSITIONS USEFUL AS ADHESIVES FOR INSULATION MATERIALS AND/OR FACINGS

BACKGROUND OF THE INVENTION

1. Field of the Invention

This invention relates generally to polyurethane compositions. More particularly, the invention relates to the use of moisture-curing, expanding polyurethane compositions as adhesives for fixing insulating materials to parts of buildings. The use according to the invention affords advantages in particular in the construction of lightweight flat roofs.

2. Statement of the Prior Art

It is known from German patent application No. 21 18 465 that polystyrene foam can be bonded to a sheet metal to form a roof covering, by means of an aqueous emulsion using a mineral fiber board intermediate layer permeable to water vapor. A disadvantage here is the long drying time of the emulsions which is also greatly affected by the air humidity level. Thus, in practice, additional mechanical fastenings such as nails or screws often have to be applied to prevent the insulating boards from being lifted by the effect of wind during the laying and before application of the final sealing layer.

It is also known that solvent-containing bitumen adhesives can be used for fixing insulating and other materials to parts of buildings. In this process, it also takes several hours for the bond to reach its ultimate strength. Another disadvantage, which also applies to emulsion-based adhesives, is the contraction in volume which the bond line undergoes during drying. Accordingly, to obtain reliable bonds, the adhesive has to be applied in comparatively thick layers, particularly where the surfaces to be bonded are uneven. This results in a relatively high consumption of adhesive.

Other disadvantages of the adhesives previously used are that emulsion-based adhesives are susceptible to condensation water while bitumen adhesives show poor temperature stability.

Polyurethane prepolymers have long been known. They are used for a variety of purposes in industry and are available in many different forms. Thus, it is known that one-component and two-component foams can be formulated on the basis of polyurethanes. Foams such as these are generally available, or may be employed, in aerosol form. Polyurethane foams of this type are described, for example, in U.S. Pat. No. 3,830,760, and corresponding German patent application No. 20 45 852. The products cure through the diffusion of moisture and are formulated in such a way that they undergo a marked increase in volume after application, which is desirable where they are used as insulating and filling materials per se. Because of their large-cell, loose structure, foams such as these never attain satisfactory mechanical strength levels and therefore cannot be considered for bonding-related applications. In addition, it is difficult to obtain uniform surface application from aerosol application.

On the other hand, polyurethane-based adhesives are also known. They either consist of prepolymers containing terminal isocyanate groups, which cure in the presence of moisture, or are formulated as twocomponent products where the prepolymers are mixed immediately before bonding with a curing agent, for example a polyhydric alcohol or a polyfunctional amine. Those concerned with polyurethane adhesives have made numerous attempts to suppress the formation of foam in order not to weaken the strength of the bond line. For example, numerous additives have been developed to absorb traces of water or reaction products thereof with a view to preventing foaming.

Thus, urethane foams are not suitable for use in accordance with the invention because they can only be applied as aerosols and because, on account of their large-cell structure, they form bonds which lack strength. Non-foaming polyurethane adhesives are also unsuitable because the application in question generally involves uneven surfaces which would lead to a high consumption of adhesive and hence to increased costs.

DESCRIPTION OF THE INVENTION

The present invention obviates the disadvantages of the adhesives previously used in this field, with regard to setting time, volume contraction, and susceptibility to moisture or elevated temperatures (for example on exposure to sunlight).

Accordingly, the present invention relates to polyurethane compositions which cure in the presence of moisture with an increase in volume, comprising (preferably consisting essentially of): from 55 to 80% by weight of a polyurethane prepolymer containing terminal isocyanate groups, from 0.5 to 8% by weight of foam stabilizers, up to 25% by weight of diluents and, if desired, up to 20% by weight of other auxiliaries, all based on the total weight of the composition.

It has been found that the above polyurethane compositions which, in their properties, come between polyurethane foams and conventional polyurethane adhesives, are particularly suitable for bonding insulating materials to parts of buildings.

The polyurethane preparations according to this invention harden with an increase in volume on contact with moisture. The polyurethane prepolymers are obtained by reacting a polyhydric alcohol with an excess of a polyfunctional isocyanate.

Suitable polyhydric alcohols contain on average from 2 to more than 4 hydroxyl groups and have a hydroxyl (acetyl) number of from about 50 to 250 and, more particularly, from about 100 to 200. Particularly suitable polyhydric alcohols are those having a number-average molecular weight of about 500 to 5000, preferably 750 to 2,000 particularly about 1,000, among which the reaction products of diols, triols or tetraols with ethylene oxide, propylene oxide or glycidol are preferred. The condensation products of tetrahydrofuran are also suitable. Diols and triols are particulary preferred, especially a triethanolaminepropylene oxide adduct (particularly with a molecular weight of about 1,000) and/or a propylene glycol (particularly with a molecular weight of about 1,000). Mixtures of any of the polyhydric alcohols may also be used. Throughout this specification, molecular weight will refer to the number-average molecular weight as measured by end-group determination, unless stated otherwise.

The isocyanates reacted with the polyhydric alcohols to obtain the prepolymers of this invention may be aromatic, aliphatic, cycloaliphatic, or any mixture thereof, provided that they are polyfunctional, and having a functionality of about 1.5 to 3.5, preferably about 2.0 to 3.0. An example of a suitable cycloaliphatic is isophorone diisocyanate and an example of a suitable aliphatic is hexamethylene diisocyanate. The preferred polyisocyanates for preparing the prepolymers of this invention are aromatic polyisocyanates, and mixtures thereof, having an average functionality about 2 to about 3. Suitable aromatic polyisocyanates include diphenylmethane diisocyanate, p-phenylene diisocyanate, and xylylene diisocyanate. Of these, diphenylmethane diisocyanate is most preferred, particularly in a (technical grade) mixture of isomers having an average functionality of about 2 to about 2.5. It should be noted that aromatic polyisocyanates having a relatively high vapor pressure, such as tolylene diisocyanate, are less suitable for this invention.

In the prepolymers of this invention, the ratio of OH groups to isocyanate groups should be in the range about 1:3-11. A larger number of isocyanate groups than 11 will yield final compositions of low viscosity, less suitable for certain applications such as adhesives. A smaller number of isocyanate groups than 3 (particularly 4) will yield final compositions of high viscosity, less suitable for certain applications such as adhesives, because they can only be applied by spatula.

The relationship of the functionality number of the polyol and/or isocyanate to the crosslinkage density of the polyurethane (and therefore to its hardness and brittleness) is well known in the art. Reference may be made to "Polyurethanes, Chemistry and Technology", Saunders and Frisch, Vol XVI of the High Polymers Series, Interscience Publishers, New York-London, Part I (1962) and Part II (1964).

The polyurethane compositions in accordance with this invention also contain foam stabilizers in quantities of from about 0.5 to 8% by weight, preferably in quantities of from about 1 to 4% by weight and, more preferably, in quantities of from about 1 to 2% by weight. Preferred stabilizers are silicone surfactants, which are block copolymers made up of a polysiloxane block and one or more polyoxyethylene and/or polyoxypropylene blocks. Products such as these are commercially available in large numbers. Although nothing definite is known of their function, it may be assumed that, during the curing process of the inventive compositions, these products stabilize the foam bubbles in the still soft foams and hence prevent . coalescence and collapse. In one preferred embodiment of the invention, the type and quantity of silicone surfactants used are coordinated in such a way that, during their curing process, the inventive compositions ultimately undergo an increase in volume of about 100-1000% and preferably about 300-900%. This result is achieved, for example, with a quantity of from 0.5 to 5% by weight of Rhodorsil-Oel 1605, a trademark of Rhone-Poulenc, France. This product is a siloxanepolyether copolymer having a viscosity of approximately 620 cSt at 25° C., a cold setting point of −38° C. and a surface tension at 25° C. of 23. 5 mN/m.

Other suitable silicone surfactants are described, for example, in the chapter by I. R. Schmolka in "Nonionic Surfactants", ed. by M. J. Schick, Vol. 2, pub. by Marcel Dekker, New York (1967). Further reference is made to B. Kanner, et al., Journal of Cellular Plastics (1979), page 315.

Of particular importance in the polyurethane compositions of this invention are the inclusion of diluents or liquifiers which reduce the composition viscosity and, to a limited extent, may also function as blowing agents. The diluents useful in this invention are only organic solvents which are low boiling, that is, which must have boiling points of between about 20° C. and about 60° C. For applications of the inventive compositions where flammability is a problem, it is important to use nonflammable organic solvents such as halogenated hydrocarbons. For applications of the inventive compositions where flammability is not a problem, other readily volatile hydrocarbon solvents may be used. The diluents may be used individually or in any mixture.

Particularly preferred halogenated hydrocarbons are trifluorotrichloroethane (1,1,2-trichlorotrifluoroethane), monofluorotrichloromethane and methylene chloride. Particularly preferred other organic solvents are pentane and diethyl ether. Other suitable diluents for use in this invention include 1,1-dichloroethane
2,2-dimethylbutane
2,3-dimethylbutane
2,3-dimethyl-1-butene.

The amount of diluent used is limited by its solubility in the inventive compositons. Where fluorinated hydrocarbons are employed up to 25% by weight, preferably 10 to 20% by weight may be added. Where other hydrocarbons are used, 4 to 10% by weight is preferred.

The polyurethane compositions of this invention may also contain known auxiliaries. For example, it is possible to use additional liquefiers which increase the flame resistance of the polyurethane foams Standard liquefiers of this type are compounds containing phosphorous and/or halogen atoms, such as tricresyl phosphate, diphenyl cresyl phosphate, tris-2-chloroethyl phosphate, tris-2-chloropropyl phosphate and tris-2,3-dibromopropyl phosphate. It is also possible to use flameproofing agents, for example chloroparaffins, halogen phosphites, ammonium phosphate and halogen- and phosphorus-containing resins.

The compositions of this invention may also contain phosphorus-free plasticizers. Suitable plasticizers of this type are, for example, esters of phthalic acid, such as di-2-ethylhexyl phthalate, diisononyl and diisodecyl phthalate, dibutyl phthalate, diisobutyl phthalate, dicyclohexyl phthalate, dimethyl glycol phthalate, dicapryl phthalate and dioctyl phthalate. Other suitable phosphorus-free plasticizers are diesters of aliphatic dicarboxylic acids, such as, for example, di-2-ethylhexyl adipate, diisodecyl adipate and also the corresponding esters of sebacic acid and azelaic acid Other suitable plasticizers are polyesters of adipic acid, sebacic acid, azelaic acid or phthalic acid with diols, such as butane diol, propane diol or various hexane diols having molecular weights in the range from 850 to 8000 Finally, the esters of fatty acid cuts with short-chain aliphatic alcohols, such as methanol, ethanol, butanol, isobutanol and isopropanol, are also suitable. Another class of suitable plasticizers are the epoxy plasticizers, i.e. epoxidized fatty acid derivatives, for example epoxidized triglycerides or epoxidized fatty acid methyl, ethyl or propyl ester.

The compositions of this invention may also contain accelerators, particularly when used as adhesives This is particularly necessary when bonding is to be carried out at or below room temperature. The accelerators normally used for polyurethane foams are suitable, including for example tertiary bases, such as bis-(N,N-dimethylamino)-diethyl ether, dimethylaminocyclohexane, N,N-dimethylbenzylamine, N-methylmorpholine and also the reaction products of dialkyl-($\beta$-hydroxyethyl)-amine with monoisocyanates and esterification products of dialkyl-($\beta$-hydroxyethyl)amine and dicarboxylic acids. Another important accelerator is 1,4-diaminobicyclo-(2.2.2)-octane. Nonbasic substances may also be used as accelerators. Nonbasic substances suitable for use as accelerators include metal compounds, such as for example iron pentacarbonyl, nickel tetracarbonyl, iron acetyl acetonate and also tin-(II)-(2-ethylhexoate), dibutyl tin dilaurate or molybdenum glycolate.

USES OF THE INVENTION COMPOSITIONS

According to the invention, the polyurethane preparations may be used for bonding a layer of insulating materials (especially thermal insulation) and/or decorative facing to parts of buildings. In this connection, they afford the advantage that a variety of different substrates and materials may be bonded to one another. Thus, in a first embodiment of the invention, insulating materials based on organic polymers, such as for example polystyrene foams or polyurethane foams, may be bonded to a variety of different building materials. The insulating materials may be bonded to metals such as iron, zinc, copper or aluminum, even in cases where the metals have been subjected to a standard surface treatment, such as passivation, lacquering or coating with plastics. In additions, the insulating materials may be bonded to mineral materials such as concrete, and ceramic such as tiles, plaster or gypsum. They may also be bonded to a variety of different plastics, including rigid PVC.

In another embodiment of the invention, mineral insulating materials such as mineral wool, or insulating materials based on expanded minerals, may be bonded to the building materials mentioned above using this invention's polyurethane compositions.

In one particularly preferred embodiment of the invention, the adhesives are used in the assembly of lightweight flat roofs. In this connection, they are particularly suitable for bonding insulating materials to trapezoidal iron plates. The increase in volume which the adhesives undergo duing their moisture curing process levels out any unevenness so that only relatively small quantities of adhesive have to be used. The adhesives utilize atmospheric moisture as their sole curing agent and it is therefore not necessary or desirable to admix water or any other curing agent with the adhesive composition. Another advantage is the short curing time of less than 2 hours, preferably 1-2 hours which is required for the adhesive to reach its final strength. As a result, the position of the insulating material cannot be changed by the effect of wind for a prolonged period after laying. Finally, the bonds according to the invention are unaffected by water vapor and heat, as generated for example by strong sunlight. de

EXAMPLES

Adhesive compositions as set forth in Table I were mixed in the parts by weight indicated, at room temperature. A slight increase in temperature to about 60° C. occurred. The adhesives were then stored for 2 days and subsequently applied from a tube to an iron plate in a layer thickness of approximately 2 mm. A standard commercially available polystyrene foam was bonded. Attempts were made at 30 minute intervals to remove the insulating material without breakage. Bonding was carried out at 23° C. and 50% relative air humidity.

In a second test, evaluated in Table II, a 1.5 mm thick adhesive layer was applied to a glass plate by means of a doctor blade. Layer thickness was remeasured after a curing time of 2 hours. It may be noted that Comparison Example 6 omitted the foam stabilizer and that Comparison Examples 7 and 8 omitted the diluent. Comparison Example 9 was a commercially available non-foaming bituminous cold adhesive. From the unsatisfactory results of Comparison Examples 6-9, one may conclude that the foam stabilizer is critical (Examples 6 and 8) and that the diluent is critical independent of the other ingredients, including the presence or absence of the foam stabilizer (Example 7). All of the comparison examples took too long to set (3 to 8 hours) or demonstrated very little or no foaming and therefore little or none of the desired expansion (the bituminous adhesive shrank, as expected). Thus, one may conclude that all of the examples according to this invention showed superior adhesive properties to all of the comparison adhesives.

TABLE I

| Function | Ingredient Identification | Examples 1 (according to this invention) | 2 | 3 | 4 | 5 | Comparison 6 | 7 | 8 | 9 |
|---|---|---|---|---|---|---|---|---|---|---|
| PREPOLYMER | diphenylmethane diisocyanate (technical isomer mixture) | 100.0 | 100.0 | 120.0 | 120.0 | 120.0 | 120.0 | 120.0 | 120.0 | * |
|  | polyhydric polyether triol (a) | 56.0 | 56.0 | 58.0 | 58.0 | 56.0 | 60.0 | 56.0 | 60.0 | — |
|  | alcohol polyether diol (b) | 10.0 | 10.0 | 10.0 | 10.0 | 10.0 | 10.0 | 10.0 | 10.0 | — |
| FOAM STABILIZER | silicone surfactant (c) | 4.0 | 4.0 | 2.0 | 2.0 | 4.0 | — | 4.0 | — | — |
| DILUENT | trifluorotrichloroethane | 50.0 | — | 15.0 | 20.0 | — | 50.0 | — | — | — |
|  | monofluorotrichloromethane | — | 50.0 | 15.0 | — | — | — | — | — | — |
|  | methylene chloride | — | — | — | 10.0 | — | — | — | — | — |
|  | n-pentane | — | — | — | — | 10.0 | — | — | — | — |
| AUXILIARY (flame resistance) | tris-chloropropyl phosphate | 30.0 | 30.0 | 30.0 | 30.0 | 30.0 | 30.0 | 30.0 | 30.0 |  |

Notes:
(a) triethanolamine-propylene oxide adduct. molecular weight approximately 1,000.
(b) polypropylene glycol. molecular weight approximately 1,000
(c) RHODORSIL-OEL 1605
*a commercially available bituminous cold adhesive having a solids content of 85%

TABLE II

| EVALUATION | Examples 1 (according to this invention) | 2 | 3 | 4 | 5 | Comparison 6 | 7 | 8 | 9 |
|---|---|---|---|---|---|---|---|---|---|
| Setting Time (hours) | <2 | <2 | <2 | <2 | <2 | >3 | >3 | >3 | >8 |

TABLE II-continued

| | EXAMPLES (parts by weight) | | | | | | | | |
|---|---|---|---|---|---|---|---|---|---|
| | according to this invention | | | | | comparison | | | |
| EVALUATION | 1 | 2 | 3 | 4 | 5 | 6 | 7 | 8 | 9 |
| Foam height of a 1.5 mm applied layer (approx., in mm) | 7 | 14 | 9 | 6 | 12 | no foam | very little foam | no foam | shrinks |
| Observation of foam structure after hardening | # | # | # | + | # | — | § | — | — |

Notes:
fine-cell, uniform foam structure - very desirable for adhesives
+ less uniform foam structure - desirable for adhesives
§ extremely large cells and irregular foam structure - undesirable for adhesives

We claim:
1. A polyurethane composition comprising:
(A) 55% to 80% of a polyurethane prepolymer containing terminal isocyanate groups which is the reaction product of
   (a) at least one polyhydric alcohol having a hydroxyl number of about 50 to 250 and a number-average molecular weight of about 500 to 5,000; and
   (b) at least one polyfunctional isocyanate which is aromatic, aliphatic, or cycloaliphatic, and which has a functionality of about 1.5 to 3.5, wherein the ratio of hydroxyl groups to isocyanate groups is in the range 1:3-11;
(B) 0.5% to 8% of at least one foam stabilizer which is a block copolymer of at least one polysiloxane block and at least one polyoxyalkylene block;
(C) 10% to 20% of at least one diluent which is an organic solvent having a boiling point of about 20° C. to 60° C.; and
(D) 0 to 20% of at least one auxiliary which is a flameproofing agent, plasticizer, or accelerator; all percentages being by weight based upon the total weight of the composition.

2. The composition of claim 1 wherein said at least one polyhydric alcohol is the reaction product of a diol, triol, or tetraol with ethylene oxide, propylene oxide or glycidol, or any mixture thereof.

3. The composition of claim 2 wherein said at least one polyhydric alcohol is the reaction product of a diol or triol and has a hydroxyl number of about 100 to 200.

4. The composition of claim 3 wherein said at least one polyhydric alcohol has a number-average molecular weight of about 750 to 2,000.

5. The composition of claim 1 wherein said polyhydric alcohol is a triethanolamine-propylene oxide adduct, a propylene glycol, or a mixture thereof.

6. The composition of claim 1 wherein said polyfunctional isocyanate is an aromatic isocyanate having a functionality of about 2 to 3.

7. The composition of claim 6 wherein said polyfunctional isocyanate is diphenylmethane diisocyanate, p-phenylene diisocyanate, xylylene diisocyanate, or a mixture thereof.

8. The composition of claim 7 wherein said polyfunctional isocyanate is a mixture of diphenylmethane diisocyanate isomers having an average functionality of about 2 to 2.5.

9. The composition of claim 5 wherein said polyfunctional isocyanate is a mixture of diphenylmethane diisocyanate isomers having an average functionality of about 2 to 2.5.

10. The composition of claim 1 wherein said polyfunctional isocyanate is a isophorone diisocyanate, a hexamethylene diisocyanate, or a mixture thereof.

11. The composition of claim 1 wherein said foam stabilizer is present in about 1% to 4%.

12. The composition of claim 11 wherein said foam stabilizer is present in about 1% to 2%.

13. The compositions of claim 1 wherein the type and quantity of foam stabilizer is such that the composition, during its curing process, undergoes an increase in volume of about 100% to 1000%.

14. The composition of claim 13 wherein the increase in volume is about 300% to 900%.

15. The composition of claim 1 wherein said at least one diluent is a hydrocarbon solvent.

16. The composition of claim 1 wherein said at least one diluent is a non-flammable halogenated hydrocarbon solvent.

17. The composition of claim 1 wherein said at least one diluent is trifluorotrichloroethane, monofluorotrichloromethane, methylene chloride, pentane, diethyl ether, or a mixture thereof.

18. The composition of claim 15 wherein said diluent is present in about 4% to 10%.

19. The composition of claim 16 wherein said diluent is present in about 10% to 20%.

20. The composition of claim 9 wherein said diluent is trifluorotrichloroethane, monofluorotrichloromethane, methylene chloride, or a mixture thereof, and is present in about 10% to 20%.

21. The composition of claim 9 wherein said diluent is pentane, diethyl ether, or a mixture thereof, and is present in about 4% to 10%.

22. The composition of claim 20 wherein at least one said auxiliary agent is present.

23. The composition of claim 22 wherein said auxiliary agent is the flame-resistant tris-chloropropyl phosphate.

24. In a method of bonding an insulating material and/or decorative facing to a building part substrate which is metal, concrete, ceramic, plaster, gypsum, or plastic, using an adhesive, the improvement comprising using an adhesive which is a polyurethane composition comprising:
(A) 55% to 80% of a polyurethane prepolymer containing terminal isocyanate groups which is the reaction product of
   (a) at least one polyhydric alcohol having a hydroxyl number of about 50 to 250 and a number-average molecular weight of about 500 to 5,000; and
   (b) at least one polyfunctional isocyanate which is aromatic, aliphatic, or cycloaliphatic, and which has a functionality of about 1.5 to 3.5, wherein the ratio of hydroxyl groups to isocyanate groups is in the range 1:3-11;
(B) 0.5% to 8% of at least one foam stabilizer which is a block copolymer of at least one polysiloxane block and at least one polyoxyalkylene block;
(C) 10% to 20% of at least one diluent which is an organic solvent having a boiling point of about 20° C. to 60° C.; and
(D) 0 to 20% of at least one auxiliary which is a flameproofing agent, plasticizer, or accelerator;

all percentages being by weight based upon the total weight of the composition; and allowing said polyurethane composition to cure for 1-2 hours at ambient temperatures by utilizing atmospheric moisture as the sole curing agent.

* * * * *